(12) United States Patent
Seo et al.

(10) Patent No.: US 11,254,842 B2
(45) Date of Patent: *Feb. 22, 2022

(54) PRESSURE-SENSITIVE ADHESIVE TAPE, METHOD FOR MANUFACTURING SAME, AND ELECTRONIC DEVICE COMPRISING SAME

(71) Applicant: AMOGREENTECH CO., LTD., Gimpo-si (KR)

(72) Inventors: In Yong Seo, Seoul (KR); Ui Young Jeong, Incheon (KR)

(73) Assignee: AMOGREENTECH CO., LTD., Gimpo-si (KR)

( * ) Notice: Subject to any disclaimer, the term of this patent is extended or adjusted under 35 U.S.C. 154(b) by 373 days.

This patent is subject to a terminal disclaimer.

(21) Appl. No.: 16/328,028

(22) PCT Filed: Aug. 21, 2017

(86) PCT No.: PCT/KR2017/009068
§ 371 (c)(1),
(2) Date: Feb. 25, 2019

(87) PCT Pub. No.: WO2018/038475
PCT Pub. Date: Mar. 1, 2018

(65) Prior Publication Data
US 2019/0185721 A1     Jun. 20, 2019

(30) Foreign Application Priority Data
Aug. 26, 2016 (KR) .......................... 10-2016-0109245

(51) Int. Cl.
*C09J 7/38*     (2018.01)
*C09J 9/02*     (2006.01)
(Continued)

(52) U.S. Cl.
CPC ... *C09J 7/38* (2018.01); *C09J 7/21* (2018.01); *C09J 7/29* (2018.01); *C09J 9/02* (2013.01);
(Continued)

(58) Field of Classification Search
None
See application file for complete search history.

(56) References Cited

U.S. PATENT DOCUMENTS

2018/0194102 A1 * 7/2018 Lima .................... B32B 5/02

FOREIGN PATENT DOCUMENTS

| KR | 200398477   | 10/2005 |
|----|-------------|---------|
| KR | 20120138736 | 12/2012 |

(Continued)

OTHER PUBLICATIONS

International Search Report—PCT/KR2017/009068 dated Nov. 28, 2017.

*Primary Examiner* — Frank D Ducheneaux
(74) *Attorney, Agent, or Firm* — Cantor Colburn LLP

(57) ABSTRACT

Provided are a pressure-sensitive adhesive tape, a method of manufacturing the same, and an electronic device having the same. The pressure-sensitive adhesive tape includes: a fiber accumulation type substrate in which a plurality of fibers are accumulated to form a plurality of pores therebetween; a metal coating layer coated on the outer circumferential surfaces of the plurality of fibers of the fiber accumulation type substrate; and an electrically conductive adhesive layer formed on one side or both sides of the fiber accumulation type substrate on which the metal coating layer is formed, wherein the electrically conductive adhesive layer is formed of an electrically conductive adhesive material filled in the plurality of pores and is electrically connected by an applied pressure.

7 Claims, 4 Drawing Sheets

(51) Int. Cl.
  *C09J 7/21* (2018.01)
  *C09J 7/29* (2018.01)
  *C09J 201/00* (2006.01)
  *C09J 201/02* (2006.01)
  *D04H 3/005* (2012.01)
  *B32B 37/00* (2006.01)

(52) U.S. Cl.
  CPC ........... *C09J 201/00* (2013.01); *C09J 201/02* (2013.01); *B32B 37/025* (2013.01); *C08K 2201/001* (2013.01); *C09J 2203/326* (2013.01); *C09J 2301/122* (2020.08); *C09J 2301/124* (2020.08); *C09J 2301/302* (2020.08); *C09J 2301/312* (2020.08); *C09J 2301/314* (2020.08); *C09J 2301/408* (2020.08); *C09J 2400/16* (2013.01); *C09J 2400/26* (2013.01); *C09J 2400/263* (2013.01); *D04H 3/005* (2013.01)

(56) References Cited

FOREIGN PATENT DOCUMENTS

| | | |
|---|---|---|
| KR | 20130006330 | 1/2013 |
| KR | 20140113226 | 9/2014 |
| KR | 20150061580 | 6/2015 |
| KR | 20160059059 | 5/2016 |

\* cited by examiner

PRESSURE-SENSITIVE ADHESIVE TAPE, METHOD FOR MANUFACTURING SAME, AND ELECTRONIC DEVICE COMPRISING SAME

CROSS-REFERENCE TO RELATED APPLICATION

This application is a national entry of PCT Application No. PCT/KR2017/009068 filed on Aug. 21, 2017, which claims priority to and the benefit of Korean Patent Application No. 10-2016-0109245 filed on Aug. 26, 2016, the entire contents of which are herein incorporated by reference.

TECHNICAL FIELD

The present disclosure relates to a pressure-sensitive adhesive tape, and more particularly, to a pressure-sensitive adhesive tape capable of maximizing flexibility, capable of increasing an electric current carrying capacity, and capable of realizing an ultra-thin structure, a method of manufacturing the same, and an electronic device having the same.

BACKGROUND ART

In recent years, electronic devices including mobile phones, notebooks, or digital cameras have achieved high-performance and high-function, and thus various components have been implemented therein.

These components are electrically and mechanically connected within the case of the electronic device and various connecting components are required for connecting these components.

Among these connecting components, the pressure-sensitive adhesive tape includes a pressure-sensitive adhesive material which can be adhered by a light pressure to maintain a strong adhesive state.

Meanwhile, electromagnetic waves generated in electronic devices such as PCs and mobile phones have caused various electromagnetic disturbances ranging from malfunctions of electronic devices to negative effects on human bodies.

Electromagnetic shielding technology can be divided into a method of shielding external devices by shielding the vicinity of an electromagnetic wave generating source and a method of protecting an electronic device inside a shielding material and protecting the electronic device from an external electromagnetic wave generating source.

Currently, various techniques for enhancing electromagnetic wave shielding are being continuously developed, and When one side of a current carrying conductive tape is absorbed or adhered to a shield can surrounding an electromagnetic wave generating source and electromagnetic waves are absorbed to a shielding sheet attached to the other side of the current carrying conductive tape, it is necessary to develop a technique of a current carrying conductive tape to connect the absorbed electromagnetic wave to the ground through the shield can.

Korean Patent Application Publication No. 10-2015-0061580 (Patent Document 1) discloses a conductive adhesive tape having an adhesive layer. The adhesive layer contains a resin component and conductive particles, and the conductive particles have a particle size distribution curve having a peak top in a particle diameter range of 15 μm or more to 50 μm or less and a particle diameter range of 1 μm or more to 12 μm or less. Disclosed is a conductive adhesive tape containing 40% by mass or more and 80% by mass or less in the adhesive layer, and having a true density of more than 0 and less than 8 g/cm'.

The adhesive layer of the conductive adhesive tape of Patent Document 1 has a demerit that the adhesive layer is swollen to widen the intervals of the conductive particles, thereby deteriorating the electrical conductivity, in the case that the adhesive layer is repeatedly subjected to thermal shock and exposed to excessive moisture, after being made of resin and conductive particles and then adhered.

DISCLOSURE

Technical Problem

The present disclosure has been made in view of the above-mentioned problems, and it is an object of the present disclosure to provide a pressure-sensitive adhesive tape capable of improving electromagnetic wave shielding performance by increasing an electric current carrying capability, a method of manufacturing the same, and an electronic device having the same.

Another object of the present disclosure is to provide a pressure-sensitive adhesive tape capable of realizing an ultra-thin structure, a manufacturing method thereof, and an electronic device having the same.

Technical Solution

In order to achieve the above-mentioned object, according to an aspect of the present disclosure, there is provided a pressure-sensitive adhesive tape including: a fiber accumulation type substrate in which a plurality of fibers are accumulated to form a plurality of pores therebetween; a metal coating layer coated on the outer circumferential surfaces of the plurality of fibers of the fiber accumulation type substrate; and an electrically conductive adhesive layer formed on one side or both sides of the fiber accumulation type substrate on which the metal coating layer is formed, wherein the electrically conductive adhesive layer is formed of an electrically conductive adhesive material filled in the plurality of pores and is electrically connected by an applied pressure.

In addition, the fiber accumulation type substrate may be a nanofiber web made of fibers having a diameter of 1 μm or less or a nonwoven fabric web made of fibers having a diameter of more than 1 μm.

In addition, the fiber accumulation type substrate has a structure in which a nanofiber web is bonded to one surface or both surfaces of a nonwoven fabric web made of fibers having a diameter of more than 1 μm, and the nanofiber web may be formed by accumulating fibers of a polymer material obtained by electrospinning on one surface or both surfaces of the nonwoven fabric web, or may be formed by laminating a separately formed nanofiber web on one surface or both surfaces of the nonwoven fabric web.

The electrically conductive adhesive layers may be made of an adhesive material in which an electrically conductive filler is dispersed.

In addition, the diameters of the fibers may be 100 nm to 5 μm.

In addition, the metal coating layer may include a multi-layered metal coating layer coated on the outer circumferential surface of the fiber, and the multi-layered metal coating layer may be a Ni/Cu two-layer structure or a Ni/Cu/Ni three-layer structure.

Here, the thickness of the metal coating layer may be 0.05 μm to 1 μm.

In addition, the sum of the thickness of the fiber accumulation type substrate on which the metal coating layer is formed and the thickness of the electrically conductive adhesive layers may be 50 μm or less, preferably 30 μm or less.

According to an aspect of the present disclosure, an electronic device according to an embodiment may be configured such that the pressure-sensitive adhesive tape adheres to an electromagnetic wave generating unit or is adhered near the electromagnetic wave generating unit.

According to an aspect of the present disclosure, there is provided a method of manufacturing a pressure-sensitive adhesive tape, the method comprising: forming a fiber accumulation type substrate in which a plurality of fibers are accumulated to form a plurality of pores therebetween; forming a metal coating layer by coating a metal on outer circumferential surfaces of the plurality of fibers of the fiber accumulation type substrate; and forming an electrically conductive adhesive layer by filling an electrically conductive adhesive material in the plurality of pores of the fiber accumulation type substrate on which the metal coating layer is formed, wherein the electrically conductive adhesive layer is formed on one side or both sides of the fiber accumulation type substrate and is electrically connected by an applied pressure.

Here, the forming of the electrically conductive adhesive layer may be performed by one of processes of: forming the electrically conductive adhesive layer by dip coating an electrically conductive adhesive material on a fiber accumulation type substrate having the metal coating layer formed thereon; forming the electrically conductive adhesive layer by laminating an electrically conductive adhesive sheet made separately from the fiber accumulation type substrate on which the metal coating layer is formed, with the fiber accumulation type substrate on which the metal coating layer is formed; forming the electrically conductive adhesive layer by accumulating fibers or droplets of the electrically conductive adhesive material on the fiber accumulation type substrate on which the metal coating layer is formed by electrospinning or electrospraying a spinning solution or a spraying solution in which an electrically conductive adhesive material is mixed with a solvent; and forming the electrically conductive adhesive layer by passing the fiber accumulating type substrate on which the metal coating layer is formed through a gravure roll.

In addition, the forming of the fiber accumulation type substrate may include: accumulating fibers having a diameter of 100 nm to 5 μm obtained by electrospinning a polymeric material.

Advantageous Effects

According to the present disclosure, the pressure-sensitive adhesive tape includes an electrically conductive adhesive layer formed on the pores and the surface in the fiber accumulation type substrate excellent in electrical conductivity. When the pressure-sensitive adhesive tape is adhered to an object by applying pressure, the electric current carrying ability is increased to thus improve the shielding efficiency, enable rework, and obtain restoring force.

According to the present disclosure, a pressure-sensitive adhesive tape may be implemented as an ultra-thin structure having a thickness of 50 μm or less, preferably 30 μm or less, to thus provide an effect that electromagnetic waves generated in an electromagnetic wave generating unit of an electronic device can be efficiently shielded to meet the specifications of the electronic device including an up-to-date portable terminal.

BEST MODE

Hereinafter, embodiments of the present invention will be described in detail with reference to the accompanying drawings.

Figure 1:
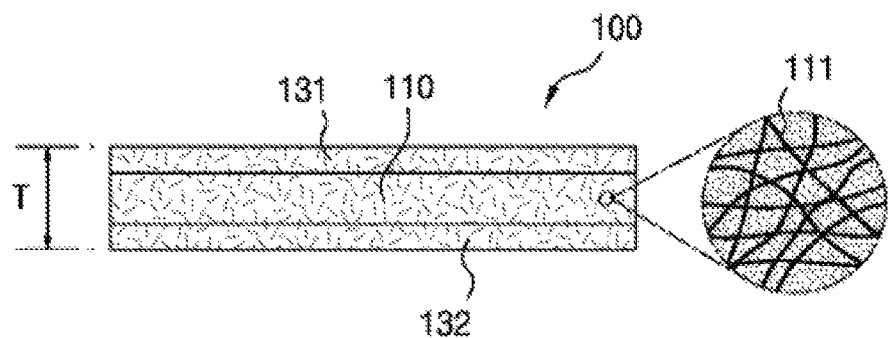
FIG. 1 is a cross-sectional view of a pressure-sensitive adhesive tape according to the present disclosure.

Referring to FIG. 1, a pressure-sensitive adhesive tape 100 according to an embodiment includes: a fiber accumulation type substrate 110 in which a plurality of fibers 111 are accumulated to form a plurality of pores therebetween; a metal coating layer (not shown) coated on the outer circumferential surfaces of the plurality of fibers 111 of the fiber accumulation type substrate 110, to make the size of the plurality of pores small; and an electrically conductive adhesive layer 131 or 132, or electrically conductive adhesive layers 131 and 132, formed on one side or both sides of the fiber accumulation type substrate 110 on which the metal coating layer is formed, wherein the electrically conductive adhesive layer is formed of an electrically conductive adhesive material filled in the plurality of pores and is electrically connected by an applied pressure.

The fiber accumulation substrate 110 is a fibrous web sheet formed by accumulating fibers, and the fibrous web sheet is generally made of a nanofiber web composed of relatively small-sized fibers having a diameter of 1 μm or less or a nonwoven fabric web composed of relatively large-sized fibers having a diameter more than 1 μm.

In addition, the fiber accumulation type substrate 110 is formed by accumulating fibers 111 obtained by electrospinning a polymer material. Here, a plurality of the fibers obtained by electrospinning are dropped and accumulated, and a large number of pores are formed between the fibers.

The metal coating layer is a coating layer of a metal material having an excellent electrical conductivity, and Ni, Cu, Ag, etc. may be used as the metal. The metal coating layer can be formed by an electroless plating method.

The electrically conductive adhesive layers 131 and 132 are implemented with an adhesive material in which an electrically conductive filler is dispersed, and the electrically conductive filler 136 uses at least one of metal powder such as Ni, Cu, and Ag, which is excellent in electrical conductivity, carbon black powder, carbon nanotube powder, and graphene powder.

In the present invention, a metal coating layer is formed on the outer circumferential surfaces of a plurality of fibers 111 of the fiber accumulation type substrate 110 to implement the fiber accumulation type substrate as a substrate having an excellent electrical conductivity and improved flexibility.

In addition, in the pressure-sensitive adhesive tape 100 according to an embodiment of the present invention, since the electrically conductive adhesive layers are formed on the pores and the surface in the fiber accumulation type substrate having excellent electrical conductivity, the pressure-sensitive adhesive tape 100 is pressurized to increase the electric current carrying ability when the pressure-sensitive adhesive tape 100 is adhered to an object, thereby increasing the shielding performance.

Further, the pressure-sensitive adhesive tape of the present invention can be reworked when being torn off and re-used after being adhered, and at this time, the fiber accumulation type substrate can have a restoring force.

In addition, in the present invention, the sum (T) of the thickness of the fiber accumulation type substrate 110 on which the metal coating layer is formed and the thickness of the electrically conductive adhesive layer may be 50 μm or less, preferably 30 μm or less. That is, the pressure-sensitive adhesive tape can be realized as an ultra-thin structure having a thickness of 30 μm or less, and thus satisfies the specification of an electronic device including a latest portable terminal. As a result, there is an advantage that electromagnetic waves generated from an electromagnetic wave generating unit of an electronic device, for example, an AP (Application Processor) can be effectively shielded.

In the pressure-sensitive adhesive tape 100 according to an embodiment of the present invention, the metal coating layers are coated on the outer circumferential surfaces of the plurality of fibers 111 of the fiber accumulation type substrate 110. Accordingly, the electrically conductive adhesive layers 131 and 132 are formed on one or both surfaces of the fiber accumulation type substrate 110 in a state where the fiber accumulation type substrate 110 has electrical conductivity, and the electrically conductive adhesive layers 131 and 132 are filled into the pores of the fiber accumulation type substrate 110. Accordingly, the pressure-sensitive adhesive tape 100 is adhered to the electromagnetic wave generating unit such as an AP (application processor) chip or its vicinity by applying pressure, to thereby have an electromagnetic wave shielding function.

Figure 2A:
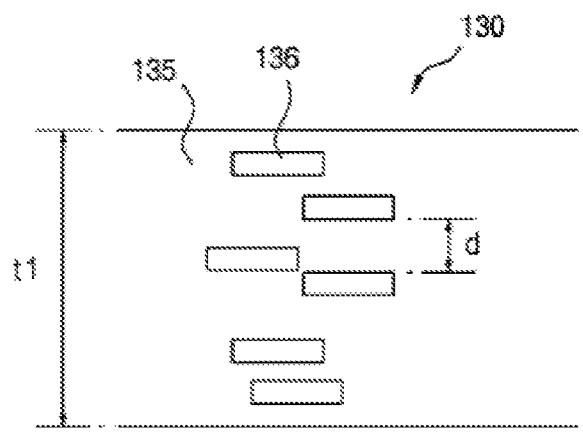
FIGS. 2A and 2B are schematic diagrams for explaining the states before and after pressing of an electrically conductive adhesive layer of a pressure-sensitive adhesive tape according to the present disclosure.

That is, as shown in FIG. 2A, before pressure is applied to the pressure-sensitive adhesive tape 100, the electrically conductive fillers 136 dispersed in the adhesive material layer 135 of the electrically conductive adhesive layer 130 included in the pressure-sensitive adhesive tape 100 are spaced apart from each other by a predetermined distance d. However, as shown in FIG. 2B, in the case that the pressure is applied to the pressure-sensitive adhesive tape 100 to thus make the pressure-sensitive adhesive tape 100 adhered to a target area, the plurality of electrically conductive fillers 136 dispersed in the adhesive material layer 135 of the electrically conductive adhesive layer 130 are pressed by the pressure to contact each other to then be electrically connected with each other.

Here, when the pressure-sensitive adhesive tape 100 is electrically connected to the target area and is connected to the ground for frame grounding, the electromagnetic wave generated by the electromagnetic wave generating unit can be absorbed or the electromagnetic wave introduced from the outside can be emitted through the ground, so that the electromagnetic wave can be shielded.

Figure 2B:
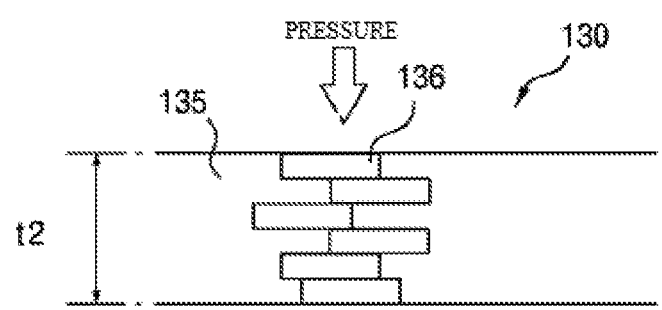

FIGS. 2A and 2B schematically exaggeratedly illustrate the characteristics of the electrically conductive adhesive layer 130 included in the pressure-sensitive adhesive tape 100 according to an embodiment of the present invention. In conception, the thickness t2 of the electrically conductive adhesive layer 130 after the pressure is applied is slightly reduced from the thickness t1 of the electrically conductive adhesive layer 130 before the pressure is applied.

Figure 3A:
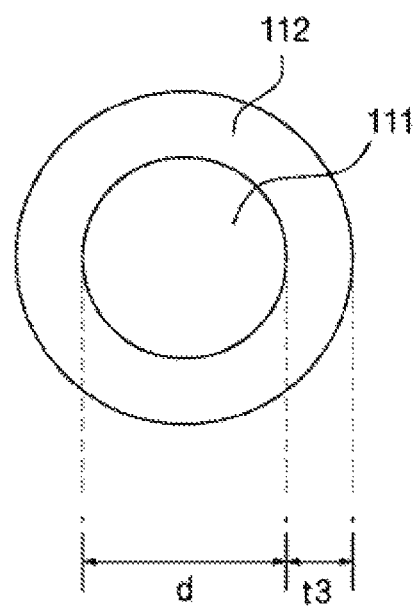
FIGS. 3A and 3B are schematic sectional views for explaining the states in which a metal coating layer is formed on fibers of a fiber accumulation type substrate of a pressure-sensitive adhesive tape according to the present disclosure.
Figure 3B:
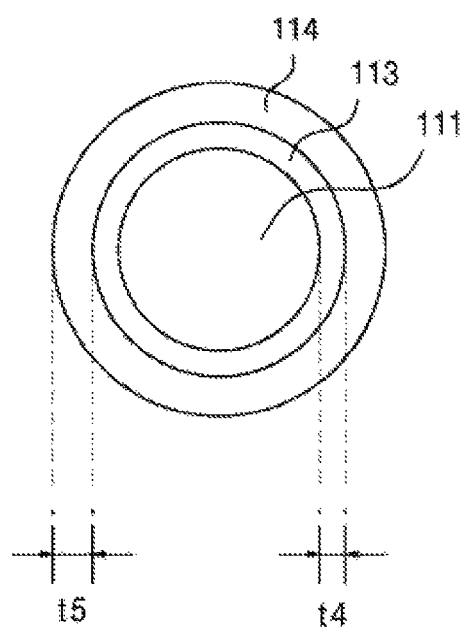

Referring to FIGS. 3A and 3B, a metal coating layer 112 is formed on the outer circumferential surface of the fiber 111 of the fiber accumulation type substrate, and referring to FIG. 3B, metal coating layers 113 and 114 are formed on the outer circumferential surface of the fiber 111 of the fiber accumulation type substrate.

Here, fibers of a polymer material are accumulated to form the fiber accumulation type substrate having electrical insulation characteristics. However, the fiber accumulation type substrate 110 having the metal coating layer 112 or the metal coating layers 113 and 114 formed on the outer circumferential surface of the fiber 111 has electrical conductivity.

As shown in FIG. 3A, a single-layered metal coating layer 112 may be formed on the outer circumferential surface of the fiber 111. Otherwise, as shown in FIG. 3B, two-layered first and second metal coating layers 113 and 114 may be formed on the outer circumferential surface of the fiber 111.

Referring to FIG. 3B, the first and second metal coating layers 113 and 114 of the two layers are formed to increase the coating property and the electrical conductivity of the fibers 111. First, the first metal coating layer 113 of Ni, serving as a seed, can be coated on the outer circumferential surface of the fiber 111, and then the second metal coating layer 114 of Cu which is excellent in electrical conductivity can be coated on the outer circumferential surface of the first metal coating layer 113 of Ni.

The thickness t4 of the first metal coating layer 113 of Ni may be preferably smaller than the thickness t5 of the second metal coating layer 114 of Cu and the metal coating layer 112 of the single layer and the first and second metal coating layers 113 and 114 of the two layers are preferably in the range of 50 nm to 1 μm.

In addition, according to an embodiment, the metal coating layer may be formed of a metal coating layer having a multi-layered structure of Ni/Cu/Ni on the outer circumferential surface of the fiber 111, and the outermost metal coating layer may be made of a metal such as Au to increase electrical conductivity.

On the one hand, it is preferable that the metal coating layer 112 of the single layer should be formed on the outer circumferential surface of the fiber 111 by electroless plating, or the metal coating layer 113 of Ni should be coated on the outer circumferential surface of the fiber 111 by electroless plating. On the other hand, it is preferable that the metal coating layer 114 of Cu having excellent electrical conductivity should be coated on the outer circumferential surface of the metal coating layer 113 of Ni by electrolytic plating.

It is preferable that the diameter d of the fibers 111 of the fiber-accumulating substrate should be in the range of 100 nm to 5 μm.

Figure 4A:
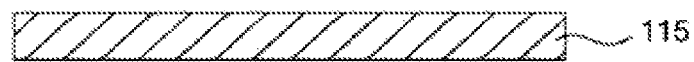
FIGS. 4A to 4C are cross-sectional views showing modifications of a fiber accumulation type substrate of a pressure-sensitive adhesive tape according to the present disclosure.
Figure 4B:
Figure 4C:
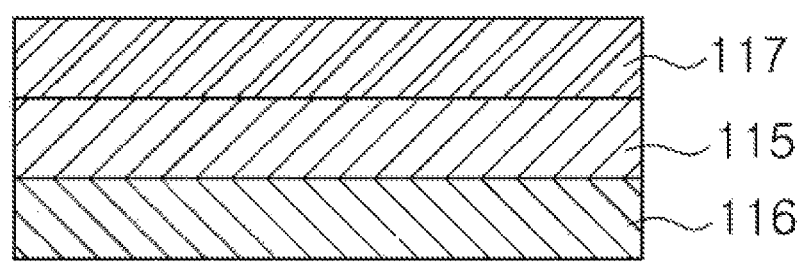

Referring to FIGS. 4A to 4C, the fiber accumulation type substrate 110 may include a nanofiber web made of fibers of a relatively small-diameter of 1 μm or less, or a nonwoven fabric web 115 made of fibers of a relatively large-diameter exceeding 1 μm, alone (FIG. 4A).

In order to improve the strength of the fiber accumulation type substrate 110 and to reduce the manufacturing cost thereof, a nanofiber web 116 formed by accumulating fibers of a polymer material obtained by electrospinning, may be bonded on one surface (FIG. 4B) of a nonwoven fabric web 115 made of fibers of a relatively large-diameter exceeding 1 μm, or nanofiber webs 116 and 117 formed by accumulating fibers of a polymer material obtained by electrospinning, may be respectively bonded on both surfaces (FIG. 4C) of the nonwoven fabric web 115 made of fibers of the relatively large-diameter exceeding 1 μm, or the nanofiber web 116 made separately may be bonded on one surface (FIG. 4B) of the nonwoven fabric web 115 or the nanofiber webs 116 and 117 made separately may be respectively bonded on both surfaces (FIG. 4C) of the nonwoven fabric web 115, thereby forming a laminated stacking structure.

Figure 5:
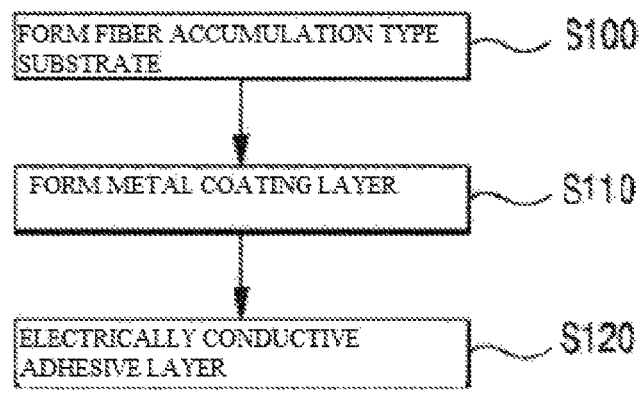
FIG. 5 is a flowchart of a method of manufacturing a pressure-sensitive adhesive tape according to the present disclosure.

Referring to FIG. 5, a method of producing the pressure-sensitive adhesive tape according to an embodiment of the present invention will be described. First, a spinning solution is prepared by mixing a polymer material and a solvent, and then a plurality of fibers are accumulated by spinning the fibers by, for example, an electrospinning method. Accordingly, a fiber accumulation substrate 110 in which a plurality of pores are formed between the plurality of fibers is formed (S100).

Thereafter, a metal coating layer is formed by coating a metal on outer circumferential surfaces of the plurality of fibers of the fiber accumulation type substrate 110 (S110)

Next, electrically conductive adhesive layers 131 and 132 are formed (S120) by filling an electrically conductive adhesive material into the plurality of pores of the fiber accumulation substrate 110 on which the metal coating layer is formed in which the electrically conductive adhesive layers 131 and 132 are formed on one or both surfaces of the fiber accumulation substrate 110 and electrically connected by an applied pressure.

The electrically conductive adhesive layer 130 is formed by a method of dip coating, laminating and electrospinning or electrospraying.

Figure 6A:
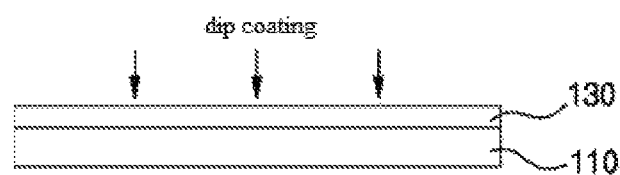
FIGS. 6A to 6C are schematic cross-sectional views for explaining a method of forming an electrically conductive adhesive layer on a fiber accumulation type substrate of a pressure-sensitive adhesive tape according to the present disclosure.

That is, as shown in FIG. 6A, an electrically conductive adhesive material is dip coated on a fiber accumulation type substrate 110 having a metal coating layer formed thereon to thereby form an electrically conductive adhesive layer 130.

Figure 6B:
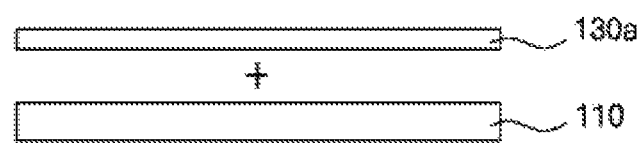

In addition, as a lamination method as shown in FIG. 6B, a fiber accumulation substrate 110 is formed by spinning a spinning solution on a transfer sheet such as PET or paper by an electrospinning method to then form a metal coating layer on the fiber accumulation substrate 110. Thereafter, the transfer sheet is separated by a transfer method while laminating a separately made electrically conductive adhesive sheet 130a with the fiber accumulation type substrate 110 on which the metal coating layer is formed.

Figure 6C:
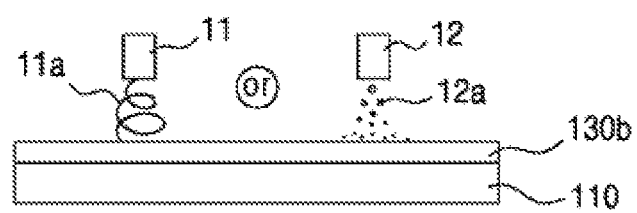

In addition, as shown in FIG. 6C, a spinning solution or a spraying solution containing a mixture of an electrically conductive adhesive material and a solvent is electrospun or electrosprayed through a nozzle 11 or 12, and thus fibers 11a or droplets 12a of an electrically conductive adhesive material are accumulated on a fiber accumulation type substrate 110 on which a metal coating layer is formed, to thereby form an electrically conductive adhesive layer 130b.

In addition to the above-mentioned method of forming the electrically conductive adhesive layer 130 on the fiber accumulation type substrate 110 having the metal coating layer, it is possible to coat an electrically conductive adhesive material on the fiber accumulation type substrate 110 while passing the fiber accumulation type substrate 110 through the gravure roll.

While the present invention has been particularly shown and described with reference to exemplary embodiments thereof, by way of illustration and example only, it is clearly understood that the present invention is not to be construed as limiting the present invention, and various changes and modifications may be made by those skilled in the art within the protective scope of the invention without departing off the spirit of the present invention.

INDUSTRIAL APPLICABILITY

The present invention can be applied to a pressure-sensitive adhesive tape capable of maximizing flexibility and enhancing an electric current carrying capacity to improve electromagnetic wave shielding performance and realizing an ultra-thin structure.

What is claimed is:

1. A pressure-sensitive adhesive tape comprising:
   a fiber accumulation substrate in which a plurality of fibers are accumulated to form a plurality of pores therebetween;
   a metal coating layer coated on outer circumferential surfaces of the plurality of fibers of the fiber accumulation substrate; and
   an electrically conductive adhesive layer formed on one side or both sides of the fiber accumulation substrate, the electrically conductive adhesive layer being formed of an electrically conductive adhesive material, wherein the electrically conductive adhesive material is filled in the plurality of pores and is configured to be electrically conductive by an applied pressure.

2. The pressure-sensitive adhesive tape of claim 1, wherein the electrically conductive adhesive material is made of an adhesive material and an electrically conductive filler dispersed in the adhesive material.

3. The pressure-sensitive adhesive tape of claim 1, wherein the fibers have a diameter of 100 nm to 5 μm.

4. The pressure-sensitive adhesive tape of claim 1, wherein the metal coating layer comprises a multi-layered metal coating layer, wherein the multi-layered metal coating layer is a Ni/Cu two-layer structure or a Ni/Cu/Ni three-layer structure.

5. The pressure-sensitive adhesive tape of claim 1, wherein the the metal coating layer has a thickness of 0.05 μm to 1 μm.

6. The pressure-sensitive adhesive tape of claim 1, wherein a total thickness of the fiber accumulation substrate and the electrically conductive adhesive layer is 50 μm or less.

7. An electronic device, wherein the pressure-sensitive adhesive tape according to claim 1 is adhered to an electromagnetic wave generating unit or is adhered in a vicinity of the electromagnetic wave generating unit.

* * * * *